United States Patent

Okitsu et al.

[11] Patent Number: 6,048,617
[45] Date of Patent: Apr. 11, 2000

[54] SURFACE-COATED MOLDED PLASTIC ARTICLES HAVING GOOD DURABILITY

[75] Inventors: Kiyoshi Okitsu, Shizuoka; Kaoru Mochizuki, Tokyo, both of Japan

[73] Assignee: Origin Electric Company, Limited, Tokyo, Japan

[21] Appl. No.: 08/793,510

[22] PCT Filed: Jun. 28, 1996

[86] PCT No.: PCT/JP96/01806

§ 371 Date: Feb. 25, 1997

§ 102(e) Date: Feb. 25, 1997

[87] PCT Pub. No.: WO97/02311

PCT Pub. Date: Jan. 23, 1997

[30] Foreign Application Priority Data

Jun. 30, 1995 [JP] Japan ................................. 7-186656

[51] Int. Cl.[7] .................................................. B32B 27/30
[52] U.S. Cl. .................... 428/412; 428/413; 428/477; 428/515; 428/516; 428/518; 428/520
[58] Field of Search ........................... 428/412, 515, 428/477, 518, 514, 520, 413, 516; 525/327.3, 330.7, 330.9, 360

[56] References Cited

U.S. PATENT DOCUMENTS 4,298,632 11/1981 Schroeter et al. ..................... 427/160
5,087,286 2/1992 Fukuda et al. ....................... 106/287.16
5,756,777 5/1998 Shinohara et al. ..................... 549/523

FOREIGN PATENT DOCUMENTS 58-196237 11/1983 Japan .
1-186876 7/1989 Japan .
4-236212 8/1992 Japan .

*Primary Examiner*—Paul Thibodeau
*Assistant Examiner*—D. Lawrence
*Attorney, Agent, or Firm*—Morgan & Finnegan, LLP

[57] ABSTRACT

The present invention relates to a surface-coated plastic product which has excellent durability such as weatherability, scratch resistance and thermal stability.

The present invention relates to, for example, a surface-coated plastic product of a resin selected from the group composed of a polycarbonate resin, an ABS resin, an acrylic resin, a polyvinyl chloride resin, a polyamide resin, a polyphenylene oxide resin or a resin alloy containing these, coated with a coating composed of a curable resin composition containing 100 parts by weight of an acrylic resin of a weight average molecular weight of 2,000 to 30,000, 0.01 to 10 parts in weight of an organometallic compound, 0.01 to 10 parts in weight of a silicon compound containing a silanol group or capable of forming a silanol group by heating or photo-irradiation and 0.01 to 10 parts by weight of a UV absorbent.

9 Claims, No Drawings

SURFACE-COATED MOLDED PLASTIC ARTICLES HAVING GOOD DURABILITY

TECHNICAL FIELD

The present invention relates to a plastic-molded product coated with a coating which is used for surface coating of various plastic products such as a polycarbonate resin, an ABS resin, an acrylic resin, and more specifically, to a plastic-molded product coated with a coating which is composed of a curable resin composition containing a specific acrylic resin, an organometallic compound and a silicon compound, for example, on a headlamp cover for an automobile composed of polycarbonate resin.

BACKGROUND ART

Recently, headlamp covers for an automobile are flattened and curved in order to achieve a good style and reduce air resistance. Thus, materials for headlamp covers are being switched from glass which is hard to process to plastics having easy moldability. In particular, a polycarbonate resin is preferably used among plastic materials because of its excellent thermal resistance against high temperature due to the lamp sealed in the headlamp cover for an automobile. Such a requirement for a polycarbonate resin exists also in other plastics, and various plastics are widely used in place of glass, wood and metals in many products. In the following part, a polycarbonate resin is mainly described.

The polycarbonate resin has an excellent thermal resistance but low weatherability by its nature, and it is liable to strongly discolor in yellow or deteriorate. The scratch resistance and chemical resistance are also poor. Therefore, it is difficult to use the polycarbonate resin for the above-mentioned headlamp covers for an automobile, and the like, without any protection.

As a method to solve such problems, there is provided a method to coat coating such as an urethane containing a UV absorbent on the surface of a polycarbonate molded product and thermally cure to form a protective film. This method can improve the scratch resistance but sometimes fails in obtaining sufficient hardness and weatherability.

On the other hand, recently, various methods to use a UV curing resin as a protective coating have been proposed. In this case, two methods are adopted in order to avoid the disadvantage that a UV curing resin which contains a UV absorbent is cured with UV ray, (1) a double coating method and (2) a thickening by coating method.

The double coating method is a method to form a coated film of non-UV curing type containing a UV absorber, then to form a UV curing resin film of good scratch resistance. This method, however, is easy to balance performances by dividing the functions, but has problems that the process become complex and delamination is liable to occur in the interface between two coated layers.

The thickly coating method is a method to make the coating as thick as possible so that the concentration per unit weight of the UV absorbent can be kept low, to thereby prevent the retardation in UV curing and form a coating with a good appearance. In this method, however, cracks tend to occur with the passage of time on the coated film due to the thick coating. Softer coating to avoid the problem results in reduction of scratch resistance.

Prevention of the deterioration due to UV and improvement of scratch resistance of products are effective from the standpoint of keeping the product appearance and extending the product life for polycarbonate resin as well as for other plastics. Accordingly, it is strongly desired to develop polycarbonate resin molded products having good scratch resistance, weatherability, and a coated surface with a good appearance, wherein a coating is coated which meets the resin properties of polycarbonate resin as the substrate and has good adhesion, scratch resistance and appearance of coated surface as well as excellent weatherability.

DISCLOSURE OF INVENTION

The present inventors discovered that a coating obtained from the curing resin composition containing a specific acrylic resin, an organometallic compound and a silicon compound as main components has excellent adhesion on various plastic-molded products, and that a plastic-molded product coated with the coating obtained from the curing rosin composition has excellent scratch resistance and weatherability to complete the present invention.

Namely, the present invention is to provide a surface-coated plastic-molded product which is a molded product of a resin selected from the group comprising a polycarbonate resin, an ABS resin, an acrylic resin, a polyvinyl chloride resin, a polyamide resin, a polyphenylene oxide resin or a resin alloy containing these, coated with the coating (hereinafter, referred to as a coating for plastics) composed of a curable resin composition containing the following (a) to (d).

(a) 100 parts by weight of an acrylic resin having a weight-average molecular weight of 2,000 to 30,000 containing no hydroxyl group and containing one or more cycloaliphatic epoxy group(s) (acrylic resin $a^1$), (b) 0.01 to 10 parts by weight of an organometallic compound, (c) 0.01 to 10 parts by weight of a silicon compound with a silanol group or capable of forming a silanol group by heating or photo-irradiation (hereinafter, simply referred to as a silicone compound), and (d) 0.01 to 10 parts by weight of a UV absorbent.

The present invention is also to provide a surface-coated plastic molded product which is a resin alloy molded product containing an ABS resin coated with the coating composed of a curable resin composition containing the following (a) to (d) (hereinafter referred to as a coating for a PC-ABS resin).

(a) 100 parts by weight of an acrylic resin having a weight-average molecular weight of 2,000 to 30,000 containing one or more hydroxyl group(s) and one or more cycloaliphatic epoxy group(s) (acrylic resin $a^2$), (b) 0.01 to 10 parts by weight of an organometallic compound, (c) 0.01 to 10 parts by weight of a silicon compound with a silanol group or capable of forming a silanol group by heating or photo-irradiation, and (d) 0.01 to 10 parts by weight of a UV absorbent.

The present invention is also to provide a surface-coated plastic molded product which is a polycarbonate resin or an ABS resin molded product coated with the coating composed of a curable resin composition containing the following (a) to (d) (hereinafter, also referred to as a coating for a PC-ABS resin).

(a) 100 parts by weight of an acrylic resin having a weight-average molecular weight of 2,000 to 10,000 containing one or more hydroxyl group(s) and one or more cycloaliphatic epoxy group(s) (acrylic resin $a^4$), (b) 0.01 to 10 parts by weight of an organometallic compound, (c) 0.01 to 10 parts by weight of a silicon compound with a silanol group or capable of forming a silanol group by heating or photo-irradiation, and (d) 0.01 to 10 parts by weight of a UV absorbent.

The present invention is also to provide a surface-coated plastic molded product which is a polypropylene resin molded product coated with the coating composed of a curable resin composition containing the following (a) to (e) (hereinafter, referred to as a coating for a PP resin (1)).

(a) 100 parts by weight or an acrylic resin $a^1$ or an acrylic resin $a^2$, (b) 0.01 to 10 parts by weight of an organometallic compound, (c) 0.01 to 10 parts by weight of a silicon compound with a silanol group or capable of forming a silanol group by heating or photo-irradiation, (d) 0.01 to 10 parts by weight of a UV absorbent, and (e) 5 to 50 parts by weight of a chlorinated polyolefin.

The present invention is also to provide a surface-coated plastic molded product which is a polypropylene resin molded product coated with the coating composed of a curable resin composition containing the following (a) to (f) (hereinafter, referred to as a coating for a PP resin (2)).

(a) 100 parts by weight of an acrylic resin $a^1$ or an acrylic resin $a^2$, (b) 0.01 to 10 parts by weight of an organometallic compound, (c) 0.01 to 10 parts by weight of a silicon compound with a silanol group or capable of forming a silanol group by heating or photo-irradiation, (d) 0.01 to 10 parts by weight of a UV absorbent, (e) 5 to 50 parts by weight of a chlorinated polyolefin, and (f) 0.01 to 10 parts by weight of a photo-stabilizer.

The present invention is also to provide a surface-coated plastic molded product which is a polypropylene resin molded product coated with the coating composed of a curable resin composition containing the following (a) to (c) (hereinafter, referred to as a coating for a PP resin (3)).

(a) 100 parts by weight of a chlorinated polyolefin modified acrylic resin which is made by modifying 100 parts by weight of an acrylic resin having a weight average molecular weight of 2,000 to 30,000 containing one or more cycloaliphatic epoxy group(s) with 5 to 50 parts by weight of a chlorinated polyolefin having chlorine content of 10 to 50 weight %; (acrylic resin $a^3$), (b) 0.01 to 10 parts by weight of an organometallic compound, and (c) 0.01 to 10 parts by weight of a silicon compound with a silanol group or capable of forming a silanol group by heating or photo-irradiation.

The present invention is also to provide a surface-coated plastic molded product which is a polypropylene resin molded product coated with the coating composed of a curable resin composition containing the following (a) to (f) (hereinafter, referred to as a coating for a PP resin (4)).

(a) 100 parts by weight of an acrylic resin $a^3$, (b) 0.01 to 10 parts by weight of an organometallic compound, (c) 0.01 to 10 parts by weight of a silicon compound with a silanol group or capable of forming a silanol group by heating or photo-irradiation, (d) 0.01 to 10 parts by weight of a UV absorbent, and (f) 0.01 to 10 parts by weight of a photo-stabilizer.

BEST MODE FOR CARRYING OUT THE INVENTION

Acrylic Resin $a^1$

The "acrylic resin having the weight-average molecular weight of 2,000 to 30,000 containing no hydroxyl group and containing one or more cycloaliphatic epoxy group(s)" which can be used for the coating for plastics in the present invention, namely, "acrylic resin $a^1$" can be obtained from a monomer having no hydroxyl group, for example, by first dissolving or dispersing a "cycloaliphatic epoxy group-containing vinyl monomer" and a "α, β-ethylenic unsaturated monomer" which is copolymerizable with a "cycloaliphatic epoxy group-containing vinyl monomer" in an "organic solvent", then by polymerizing the mixture with the dropwise addition of 2 to 10 parts by weight of "a radical polymerization initiator" in stirring, keeping the temperature at 100 to 160° C.

The specific examples of the "cycloaliphatic epoxy group-containing vinyl monomer" used in the production of the above-mentioned acrylic resin $a^1$ include 3,4-epoxycyclohexylmethyl (meth)acrylate; 2-[1,2-epoxy-4,7-methanoperhydroindene-5(6)-il]oxyethyl(meth)acrylate; 5,6-epoxy-4,7-methanoperhydroindene-2-il(meth)acrylate; 1,2-epoxy-4,7-methanoperhydroindene-5-il(meth)acrylate; 2,3-epoxycyclopentenylmethyl (meth)acrylate; (meth)acrylate of 3,4-epoxycyclohexylmethylated polycaprolactone expressed by the formula $CH_2=CHR^1COO[(CH_2)_5COO]_n$—ECHM where $R^1$ denotes H or methyl group, n denotes 1 to 10, and ECHM denotes 3,4-epoxycyclohexylmethyl group; and glycidyl (meth)acrylate.

Adducts of 3,4-epoxycyclohexyloxysilane and 3',4'-epoxycyclohexylmethyl-3,4-epoxycyclohexane carboxylate with (meth)acrylic acid may also be included.

The specific examples of the "α,β-ethylenic unsaturated monomer" include "(meth)acrylates", "carboxyl group- or alcoxycarbonyl group-containing vinyl monomers", "acid anhydride group-containing vinyl monomers", "noncycloaliphatic epoxy group-containing vinyl monomers" and "aromatic vinyl monomers".

1. "(meth)acrylates" include (meth)acrylates alkylester of a carbon number 1 to 18, for example, methyl (meth)acrylate, ethyl (meth)acrylate, n-propyl (meth)acrylate, iso-propyl (meth)acrylate, n-butyl(meth)acrylate, iso-butyl(meth)acrylate, tert-butyl(meth)acrylate, n-hexyl (meth)acrylate, n-octyl(meth)acrylate, 2-ethylhexyl (meth)acrylate, and lauryl(meth)acrylate.

2. The "carboxy group- or alcoxycarbonyl group-containing vinyl monomers" include, for example, unsaturated dibasic acids such as (moth) acrylic acid, maleic acid, fumaric acid, and an itaconic acid as well as dialkyl esters such as a dimethyl maleate and a dimethyl fumarate.

3. The "acid anhydride group- containing vinyl monomers" include, for example, maleic anhydride and itaconic anhydride.

4. The "noncycloaliphatic epoxy group-containing vinyl monomers" include, for example, glycidyl (meth) acrylate.

5. The "aromatic vinyl monomers" include, for example, styrene, α-methylstyrene, vinylstyrene and p-chlorostyrene.

6. Other than the above, (meth) acrylonitrile, vinyl acetate, vinyl propionate, butadiene, isoprene, and chloroprene may be included.

As the "radical polymerization intiators", conventional radical initiators may be used, preferably, initiators having the ten-hour half-period temperature of 50 to 110° C.

The specific examples include peroxide compounds such as t-butyl peroxypivalate, t-butyl peroxyneodecanate, t-butylperoxy-2-ethylhexanoate, and t-butylperoxy-3,5,5-trimethylhexanoate and azobisnitriles such as azobisisobutyronitrile and azobisdimethylvaleronitrile.

As the "organic solvents", alcoholic solvents, ether solvents, ester solvents and hydrocarbon solvents may be used. When a hydrocarbon solvent is used, the mixed use with another solvent is preferable from the standpoint of the solubility. After the radical polymerization, the polymerization solution may be used as it is for the preparation of a curable resin composition in the present invention without taking out the acrylic resin from the reaction liquid.

The acrylic resin $a^1$ can he made to contain one or more cycloaliphatic epoxy group(s) per polymer molecule obtained on average, though it may change depending on the kind of monomer used, normally by using the α, β-ethylenic unsaturated monomer in the range of 0 to 50 moles per ten moles of the cycloaliphatic epoxy group-containing vinyl monomer.

The weight-average molecular weight of an acrylic resin $a^1$ is preferably 2,000 to 30,000, since excellent adhesion and weatherability of the coating therefrom are obtained in this range. The range of 5,000 to 20,000 is particularly preferable.

Acrylic Resin $a^2$

The "acrylic resin having weight-average molecular weight of 2,000 to 30,000 containing one or more hydroxyl group(s) and one or more cycloaliphatic epoxy group(s)" which can be used in the coating for a PC-ABS resin and coatings (1) and (2) for a PP resin, namely "acrylic resin $a^2$" is particularly suitable for resin-molded products containing an ABS resin, and can be prepared in the same manner as the acrylic resin $a^1$ by using a "hydroxyl group-containing vinyl monomer" in place of the "α, β-ethylenic unsaturated monomer" in the above-mentioned acrylic resin $a^1$.

The specific examples of the "hydroxyl group-containing vinyl monomer" include hydroxyalkyl (meth) acrylates of a carbon number of 2 to 8, for example, a 2-hydroxyethyl (meth)acrylate, a 2-hydroxypropyl(meth)acrylate, and a 4-hydroxybutyl (meth)acrylate, and their adducts with lactones such as ε-caprolactone and a γ-valerolactone.

The polymer obtained can be made to contain one or more cycloaliphatic epoxy group(s) on average, normally by using a hydroxyl group-containing vinyl monomer in the range of 10 to 50 moles per ten moles of the cycloaliphatic epoxy group-containing vinyl monomer.

Among the acrylic resin $a^2$, those having a weight-average molecular weight of 2,000 to 10,000 (acrylic resin $a^4$) are preferably applied to the coating for a polycarbonate resin or an ABS resin-molded products, since excellent adhesion and weatherability are obtained in this range.

Acrylic Resin $a^3$

The "chlorinated polyolefin modified acrylic resin which is made by modifying 100 parts by weight of acrylic resin having the weight-average molecular weight of 2,000 to 30,000 containing one or more cycloaliphatic epoxy group (s) with 5 to 50 parts by weight of the chlorinated polyolefin having chlorine content of 10 to 50% by weight" which can be used for coating for a PP resin (3) and (4) in the present invention, namely "acrylic resin $a^3$"can be used by adding 5 to 50 parts by weight of a chlorinated polyolefin having a chlorine content of 10 to 50% by weight to the "acrylic resin $a^2$" which is prepared in the same manner as acrylic resin $a^1$ using a "hydroxyl group-containing vinyl monomer" in place of an "α,β-ethylenic unsaturated monomer" in the above-mentioned acrylic resin $a^1$.

The usable chlorinated polyolefins include, for example, a polyethylene resin, a polypropylene resin, an ethylene-propylene copolymer and an ethylene-vinyl acetate copolymer, and a polypropylene resin is particularly preferable.

When the chlorine content in a chlorinated polyolefin resin is lower than 10% by weight, the compatibility with an acrylic resin is poor, and, on the other hand, when the chlorine content is over 50% by weight, the adhesion on a polyolefin material is unpreferably reduced. Also, when the chlorinated polyolefin is modified in quantity lower than 5 parts by weight, the adhesion on polyolefin material is poor, and over 50 parts by weight performance of the coated film and weatherability are unpreferably reduced.

Organometallic Compound

The "organometallic compound" which is usable for various coatings used in the present invention includes complexes of Ga, Sn, Zr, Zn, Cu, Fe, Co, Ni, Mn, Cr, V, Pt, Mo, Pd, etc. with β-diketone, β-ketoester and salicylaldehyde derivative as ligand.

The specific examples of ligands include, for example, acetylacetone, benzoylacetone, trifluoroacetylacetone, hexafluoroacetylacetone, $PhCH_2COCH_2COCH_3$ (Ph denotes phenyl group.), $CH_3COCH$ $(CH_3)$ $COCH_3$, $(CH_3)_2CHCOCH_2COCH$ $(CH_3)_2$, $CH_3COCH_2COOC_2H_5$, $CH_3COCH_2COOC_3H_7$, $CH_3COCH_2COCCH_3$, salicylaldehyde, 2-acetylphenol and 2-hydroxybenzophenone.

The specific examples of complexes include, for example, gallium(II) acetylacetonate, tin(II) acetylacetonate, zirconium(IV) acetylacetonate, zinc(II) acetylacetonate, copper(II) acetylacetonate, iron(II) acetylacetonate, cobalt (III) acetylacetonate, nickel(II) acetylacetonate, manganese (III) acetylacetonate, chromium(III) acetylacetonate, and platinum(II) acetylacetonate. Other than the above-mentioned complexes, organoaluminum compounds can be used. The specific examples include, for example, trismethoxyaluminum, trisethoxyaluminum, trisisopropoxyaluminum, trisphenoxyaluminum, trisparamethylphenoxyaluminum, isopropoxydiethoxyaluminum, trisbutoxyaluminum, trisacetoxyaluminum, trisstearate aluminum, trisbutyrate aluminum, trispropionate aluminum, trisisopropionate aluminum, trisacetylacetonate aluminum (or aluminum trisacetylacetonate), tristrifluoroacetylacetonate aluminum, trishexafluoroacetylacetonate aluminum, trisethylacetoacetate aluminum, trissalicylaldehydate aluminum, trisdiethylmalorate aluminum, trispropylacetoacetate aluminum, trisbutylacetoacetate aluminum, trisdipivaloylmethanate aluminum, diacetylacetonatedipivaloylmethanate aluminum, and the following cyclic organoaluminum compounds (1) to (10). In the formulas Ph denotes phenyl group, B''' denotes m-phenylene group, B'' denotes trivalent residue $C_5H_3\equiv$ whose benzene ring has bonding at 1,2 and 4-positions, and A'' denotes tetravalent residue $C_6H_2$ (tetravalent) whose benzene ring has bonding at 1,2,4 and 5-positions.

Formulae (1)–(10)

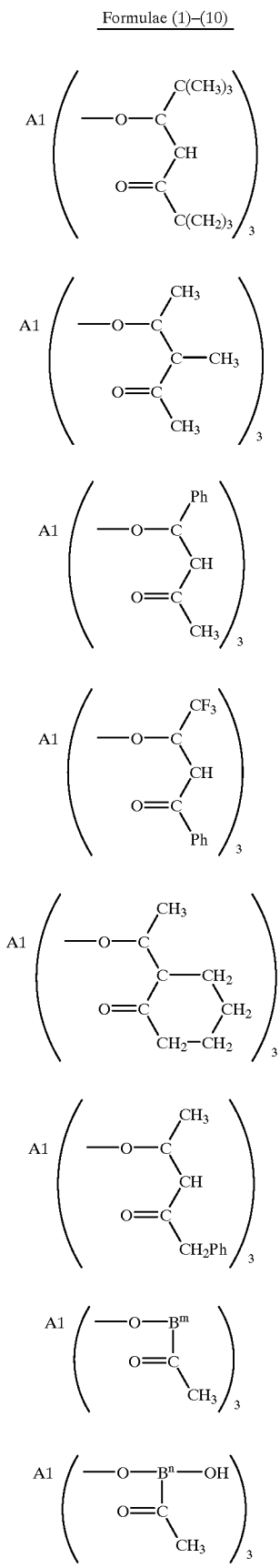

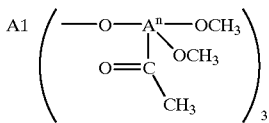

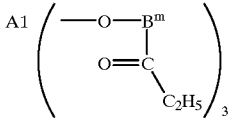

The amount of the organometallic compound to be used is 0.01 to 10 parts by weight, preferably 1 to 5 parts by weight for 100 parts by weight of the acrylic resin. When the amount is lower than 0.01 parts by weight, sufficient curing property of the coating film can not be obtained, and when the amount is over 10 parts by weight, an electrical property of the cured coating film may be lowered.

Silicon Compound

The "silicon compound with a silanol group or capable of forming a silanol group by heating or photo-irradiation" which is usable for a curable resin composition in the present invention, namely, the "silicon compound" includes the following examples.

1. The "silicon compound with a silanol group or capable of forming a silanol group by heating or photo-irradiation" is a silicon compound expressed by $SiR^1R^2R^3R^4$ ($R^1$, $R^2$, $R^3$ and $R^4$ are alkyl group, phenyl group, vinyl group or hydroxyl group, alcoxy group, alkenyloxy group, acyloxy group or halo group, respectively, and the molecule contains at least one hydroxyl group, alcoxy group, alkenyloxy group, acyloxy group or halo group.).
2. The "silicon compound with a silanol group" includes, for example, triphenylsilanol and diphenylsilanediol.
3. The "silicon compound capable of forming a silanol group by heating" includes, for example, triphonylmethoxysilane, diphenyldimethoxysilane, phenyltrimethoxysilane, tetraisopropenyloxysilane, phenyltriisopropenyloxysilane, tetraacetoxysilane, γ-mercapLopropyltriacetoxysilane, tetrachlorosilane, phenyltrichlorosilane, etc.
4. The "silicon compound capable of forming a silanol group by photo-irradiation" is preferably a silicon compound having either of benzyloxysilane group, o-nitrobenzyloxy group or α-ketosilyl group. Among these silicon compounds, the one having peroxysilane group is a compound expressed by the formula $(R^1)_n$—Si—(O—O—$R^2$)$_{4-n}$ (In the formula $R^1$ and $R^2$ may be the same or different, denoting hydrogen atom, halogen atom, alkyl or aryl of a carbon number 1 to 5, and n denotes an integer of 0 to 3.).

These silicon compounds are formulated in the range of 0.01 to 10 parts by weight, preferably 1 to 5 parts by weight, to 100 parts by weight of the acrylic resin $a^1$, $a^2$ or $a^3$.

UV Absorbent

The "UV absorbent" which is usable for a curable resin compositions in the present invention includes, for example, benzotriazol, benzophenone, triazin and oxalic anilide derivatives. These may be used solely or as a mixture of two or more kinds of them. The formulating quantity of the UV absorbent is 0.01 to 10 parts by weight, preferably 1 to 3 parts by weight, to 100 parts by weight of the acrylic resin $a^1$, $a^2$ or $a^3$.

Chlorinated Polyolefin

As the chlorinated polyolefin which is usable for a curable resin composition in the present invention, the chlorinated polyolefin of the same kind as used in the preparation of the acrylic resin $a^3$ can be used. These may be used solely or as a mixture of two or more kinds of them. The quantity to be used is preferably 5 to 50 parts by weight based on 100 parts by weight of the acrylic resin $a^1$, $a^2$ or $a^3$, since the scratch resistance is excellent in this range.

Photo-Stabilizer

The photo-stabilizer which is usable for a curable resin composition used in the present invention includes, for example, hindered amines. These may be used solely or as a mixture of two or more kinds of them. The quantity to be used is preferably 0.01 to 10 parts by weight to 100 parts by weight of the acrylic resin $a^1$, $a^2$ or $a^3$.

Coating for Plastics

The coating for plastics which is used in the present invention is prepared from a composition composed of 0.01 to 10 parts by weight of an organometallic compound, 0.01 to 10 parts by weight of a silicon compound, and 0.01 to 10 parts by weight of a UV absorbent based on 100 parts by weight of the acrylic resin $a^1$, and if necessary, by adding various additives that can be used in a conventional coating, such as a leveling agent, a flow improver and an antioxidant. In production, it is possible to use the acrylic resin $a^1$ in the solution form used in production as it is, and to prepare the coating by formulating the solution with other components according to the formulation.

In the present invention, it is possible to make one-package coating of better storage stability by adding further a "compound that can be a ligand of an organometallic compound" to the above-mentioned composition.

The "compound that can be a ligand of an organometallic compound" includes β-dikentones such as 2,4-pentadione (acetylacetone) and 2,4-heptanedione; ketoesters such as methyl acetoacetate, ethyl acetoacetate and butyl acetoacetate; hydroxycarboxylic acids or their esters or salts such as lactic acid, methyl lactate, ethyl lactate, ammonium lactate, salicylic acid, methyl salicylate, ethyl salicylate, phenylsalicylate, malic acid, ethyl malate, tartaric acid, methyl tartarate and ethyl tartarate; ketoalcohols such as 4-hydroxy-4-methyl-2-pentanone, 4-hydroxy-2-pentanone, 4-hydroxy-2-heptanone and 4-hydroxy-4-methyl-2-heptanone; aminoalchols such as monoethanoamine, diethanolamine, triethanolamine, N-methyl-monoethanoamine, N-ethyl-monoethanolamine, N,N-dimethyl-etanolamine, and N,N-diethanolamine; and enol-type active hydrogen compounds such as diethylester malonate, methylolmelamine, methylolurea and methylolacrylamide.

The coating for plastics in the present invention can be used as a coating for molded products of not only the polycarbonate resin but also the ABS resin, acrylic resin, polyvinyl chloride resin, polyamide resin, polyphenylene oxide resin and resin alloys containing these resins. The molded products include various molded products such as injection molded products, extrusion molded products, and compression molded products.

1. ABS resin and resin alloys containing these resins include not only ABS resin obtained by copolymerizing acrylonitrile-butadiene-styrene but also alloys of the ABS resin with the polyvinyl chloride resin, (meth) acrylic resin, polycarbonate resin, polyester resin and polyamide resin.
2. Acrylic resin includes an acrylic resin obtained by copolymerizing a (meth)acrylic ester and a vinyl compound radically polymerizable with these.
3. Polyvinyl chloride resin includes a polyvinyl chloride polymer and a polyvinyl chloride resin obtained by mixing plasticizer such as a phthalic ester in polyvinyl chloride polymer.
4. Polyamide resin and resin alloys containing this resin include a polyamide resin obtained by condensation polymerization of dicarboxylic acid and diamine and alloys of polyamide resin with ABS resin, polystyrene resin, polyolefin resin, polyester resin, polyphenylene sulfide resin, polycarbonate resin, polyarylate resin and elastomer.
5. Polyphenylene oxide resin and resin alloys containing this resin include a polyphenylene ether resin obtained by reacting 2, 6-disubstituted phenols and oxygen, and alloys of polyphenylene ether resin with polystyrene resin, polyamide resin, polyamide/polyolefin resin, ABS resin, styrene-butadiene resin, polyester resin, polyphenylene sulfide resin and polyacetal resin.

Coating for PC-ABS Resin

The coating for PC-ABS resin which is used in the present invention can be prepared from a composition composed of 0.01 to 10 parts by weight of an organometallic compound, 0.01 to 10 parts by weight of a silicon compound, and 0.01 to 10 parts by weight of a UV absorber to 100 parts by weight of the acryl resin $a^2$, and, if necessary, by adding various additives that can be added to a conventional coating, such as a leveling agent, a flow improver and an antioxidant. In production, it is possible to use the acrylic resin $a^2$ in the solution form used in production as it is, and to prepare the coating by formulating the solution with other components according to the formulation.

Same as in the above-mentioned coating, it is possible to make one-package coating of better storage stability by adding further a "compound that can be a ligand of an organometallic compound" to the above-mentioned composition.

The coating for PC-ABS resin in the present invention can be used as a coating for molded products of not only the above-mentioned polycarbonate resin but also ABS resin and resin alloys containing these resins. The coating can be used for the same products as aforementioned plastics such as polycarbonate resin, ABS resin and resin alloys.

Coatings for PP Resin (1), (2)

The coatings for PP resin (1), (2) which are used in the present invention can be prepared from a composition composed of 0.01 to 10 parts by weight of an organometallic compound, 0.01 to 10 parts by weight of a silicon compound, 0.01 to 10 parts by weight of a UV absorbent, and 5 to 50 parts by weight of chlorinated polyolefin, and if necessary, 0.01 to 10 parts by weight of photo-stabilizer to 100 parts by weight of the acrylic resin $a^1$, the acrylic resin $a^2$ or mixture of two resins, and further, if necessary, by adding various additives that can be used in a conventional coating, such as a leveling agent, a flow improver and an antioxidant. In production, it is possible to use the acrylic resin $a^1$ or the acrylic resin $a^2$ in the solution form used in production as it is, and to prepare the coating by formulating the solution with other components according to the formulation.

Same as in the above-mentioned coating, it is also possible to make one-package coating of better storage stability by adding further a "compound that can be a ligand of an organometallic compound" to the above-mentioned composition.

The coating for PP resin can be used as a surface coating of molded products composed of polypropylene resin.

The polypropylene resin is a propylene resin obtained by polymerizing propylene includes copolymers of propylene with other olefins as well as alloys of polypropylene with polystyrene, polyamide, polyester resin, polycarbonate resin, polyphenylene ether resin, fluororesin and elastomers.

Coatings for PP Resin (3), (4)

The coatings for PP resin (3), (4) which are used in the present invention can be prepared from a composition composed of 0.01 to 10 parts by weight of an organometallic compound, 0.01 to 10 parts by weight of a silicon compound, and, if necessary, 0.01 to 10 parts by weight of a UV absorbent and 0.01 to 10 parts by weight of photostabilizer, and further, if necessary, by adding various additives that can be used in a conventional coating, such as a leveling agent, a flow improver and an antioxidant. In production, it is possible to use the acrylic resin $a^3$ in the solution form used in production as it is, and to prepare the coating by formulating the solution with other components according to the formulation.

Same as in the above-mentioned coating, it is also possible to make one-package coating of better storage stability by adding further a "compound that can be a ligand of an organometallic compound" to the above-mentioned composition.

The coatings for PP resin (3), (4) can be used as a surface coating of molded products composed of the same polypropylene resin as described in the PP resin coatings (1), (2).

EXAMPLES

The present invention will be further explained in detail, giving examples and comparison examples, as follows. Parts used in the examples and comparison examples all mean parts by weight.

(Measuring Items)

(1) Scratch resistance: The scratch level was tested with steel wool #0000.

The load was set at 150 g/cm$^2$ and the abrasion operation at 11 rounds. Scratch resistance was expressed by the haze value (cloudiness) with 6 steps of 5 to 0, namely, 5: haze 0 to 1.0, 4:1.1 to 2.0, 3:2.1 to 3.0, 2:3.1 to 5.0, 1:5.1 to 8.0, 0:8.1 or higher.

(2) Weatherability: Appearance observation and adhesion test were made after 2,000 hours in SWOM (Sunshine Weathermeter). The evaluation standard is as follows:

Pass: Adhesion: No peel-off in the 1 mm cross-hatched cellophane tape peeling test.

Appearance: No change.

Fail: Adhesion: Some peel-off in the 1 mm cross-hatched cellophane tape peeling test.

Appearance: Some cracks and/or natural delamination observed.

(3) Initial adhesion: The 1 mm cross-hatched cellophane tape peeling test.

(4) Adhesion in warm water: Adhesion test after soaking in 40° C. water for 240 hours, taken out and kept at room temperature for 30 minutes.

(5) Solvent resistance: Pencil hardness test after soaking in the WAX remover (Commercial name: ST-7) at 45° C. for ten minutes and kept at room temperature for 24 hours.

(6) Heat cycle resistance: The 1 mm cross-hatched cellophane tape peeling test after 30 cycles of {(80° C., 95%)×2 h→room temperature×2 h→(−40° C.×2 h)→room temperature×2 h}, and appearance evaluation after 50 cycles.

(7) Hardness: Pencil hardness test.

(8) Thermal resistance: YI value (Yellowness Index: Yellowing discoloration) with 6 steps, namely, 5:YI0 to 1, 4:1 to 2, 3:2 to 3, 2:3 to 4, 1:4 to 5, 0:over 5.

Production Example 1

Preparation Example of the Acrylic Resin $a^1$

In a reactor equipped with a stirrer, thermometer, reflux condenser and a tube for feeding nitrogen, 40 parts of toluene and 50 parts of isobutyl acetate were fed, temperature was raised up to 100° C. in nitrogen atmosphere and the mixture composed of 25 parts of Cyclomer A200 [DAICEL CHEMICAL INDUSTRIES LTD. product: 3,4-epoxycyclohexylmethylacrylate] as a cycloaliphatic epoxy group-containing vinyl monomer with no hydroxyl group, 45 parts of methyl methacrylate, 20 parts of butyl methacrylate, 10 parts of butyl acrylate and 3 parts of 2,2'-azobisisobutyronitrile (hereinafter referred to as AIBN) was added dropwise taking 2 hours. After the dropwise addition, the reaction mixture was kept at the same temperature for more two hours, then the mixture composed of one part of AIBN and 10 parts of toluene was added dropwise. The reaction mixture was kept at the same temperature for more four hours to give an acrylic resin solution #A having nonvolatile of 50% and a weight-average molecular weight of 15,000.

Production Example 2

Preparation Example of the Acrylic Resin

In a reactor equipped with a stirrer, thermometer, reflux condenser and a tube for feeding nitrogen, 40 parts of toluene and 50 parts of isobutyl acetate were fed, temperature was raised up to 100° C. in nitrogen atmosphere and the mixture of 40 parts of Cyclomer A200 [DAICEL CHEMICAL INDUSTRIES, LTD. product] as a cycloaliphatic epoxy group-containing vinyl monomer, 40 parts of Placcel FA-2 [Daicel Chemical Ind. product: 2 moles adduct of ε-caprolactone to 2-hydroxyethylacrylate] as a hydroxyl group-containing vinyl monomer, 10 parts of butyl methacrylate, 10 parts of butyl acrylate and 7 parts of AIBN was added dropwise taking 2 hours. After the dropwise addition the reaction mixture was kept at the same temperature for two hours, then the mixture composed of one part of AIBN and 10 parts of toluene was added dropwise. The reaction mixture was kept at the same temperature for more four hours to give an acrylic resin solution #B having nonvolatile of 50% and a weight-average molecular weight of 7,000.

Production Example 3

Preparation Example of the Acrylic Resin $a^2$

In a reactor equipped with a stirrer, thermometer, reflux condenser and a tube for feeding nitrogen, 40 parts of toluene and 50 parts of isobutyl acetate were fed, temperature was raised up to 100° C. in nitrogen atmosphere and the mixture composed of 40 parts of Cyclomer A200 [Daicel Chemical Ind. product] as a cycloaliphatic epoxy group-containing vinyl monomer, 30 parts of Placcel FA-2 [Daicel Chemical Ind. product] as a hydroxyl group-containing vinyl monomer, 20 parts of butyl methacrylate, 10 parts of butyl acrylate and 3 parts of AIDN was added dropwise taking 2 hours. After the dropwise addition, the reaction mixture was kept at the same temperature for 2 hours, then a mixture composed of one part of AIBN and 10 parts of toluene was added dropwise. The reaction mixture was kept at the same temperature for more 4 hours to give an acrylic resin solution #C having nonvolatile of 50% and a weight-average molecular weight of 16,000.

Production Example 4

Preparation Example of the Acrylic Resin Having no Cycloaliphatic Epoxy Group in a Molecule In a reactor equipped with a stirrer, thermometer, reflux condenser and a tube for feeding nitrogen, 40 parts of toluene and 50 parts of isobutyl acetate were fed, temperature was raised up to 100° C. in nitrogen atmosphere and the mixture composed of 10 parts of Cyclomer A200 [Daicel Chemical Ind. product] as a cycloaliphatic epoxy group-containing vinyl monomer having no hydroxyl group, 45 parts of methyl methacrylate, 35 parts of butyl methacrylate, 10 parts of butyl acrylate and 3 parts of AIBN was added dropwise taking 2 hours. After the dropwise addition, the reaction mixture was kept at the same temperature for 2 hours, then the mixture composed of one part of AIBN and 10 parts of toluene was added dropwise. The reaction mixture was kept at the same temperature for more 4 hours to give an acrylic resin solution #D having nonvolatile of 50% and weight average molecular weight of 15,000.

Production Example 5
Preparation Example of the Acrylic Resin

In a reactor equipped with a stirrer, thermometer, reflux condenser and a tube for feeding nitrogen, 40 parts of toluene, 50 parts of isobutyl acetate and 20 parts of 80% of toluene solution of chlorinated polypropylene [Toyo Kagaku Co., product "Hardlen 14 LLB"] were fed, temperature was raised up to 100° C. in nitrogen atmosphere and the mixture composed of 25 parts of Cyclomer A200 [Daicel Chemical Ind. product] as a cycloaliphatic epoxy group-containing vinyl monomer, 45 parts of methyl methacrylate, 20 parts of butyl methacrylate, 10 parts of butyl acrylate and 3 parts of AIBN was added dropwise taking 2 hours. After the dropwise addition, the reaction mixture was kept at the same temperature for more 2 hours, then the mixture composed of one part of AIBN and 10 parts of toluene was added dropwise. The reaction mixture was kept at the same temperature for more 4 hours to give an acrylic resin solution #E having nonvolatile of 48% and a weight-average molecular weight of 16,000.

Example 1

5 parts of methyl isobutylketone, 10 parts of normal butanol, further 2 parts of an oxalic anilide UV absorbent "Sanduvor 3206" (Sandoz Corp.), 2 parts of a hindered amine photo-stabilizer "Sanduvor 3058" (Sandoz Corp.) and 1 part of aluminum tris-acetylacotonate were added to 83 parts of the acrylic resin solution #B obtained in Production Example 2 to produce the coating composition #B-1.

100 parts of the above-mentioned coating composition #B-1 was added with 10 parts of the curing agent that was separately made by dissolving 3 parts of triphenylsilanol in 97 parts of toluene, spray-coated on polycarbonate resin samples [LEXAN LS-II (GE Plastics product)] and ABS resin samples degreased with isopropylalcohol so that the coating thickness was 10 μm, dried at 80° C. for 30 minutes under forced circulation, then placed in an atmosphere of room temperature for 3 days to prepare test pieces. The size of the test pieces was 10 mm long, 5 mm wide and 3 mm thick (The size was the same hereinafter).

Scratch resistance, weatherability, initial adhesion, adhesion in warm water, solvent resistance, heat cycle resistance and hardness were measured with the test pieces. The results are shown in Table 1 and Table 2.

Example 2

To a formulated product obtained by adding 5 parts of methyl isobutylketone, 10 parts of normal butanol, further 2 parts of a UV absorber "Sanduvor 3206" (Sandoz Corp.) and 2 parts of a photo-stabilizer "Sanduvor 3058" (Sandoz Corp.) to 83 parts of the acrylic resin solution #C obtained in Production Example 3, 1 part of aluminum tris-acetylacetonate was added to produce a coating composition #C-1. 100 parts of the coating composition #C-1 was added with 10 parts of the curing agent containing triphenylsilanol in Example 1, spray-coated on ABS resin samples degreased with isopropyl alcohol and the polycarbonate resin samples used in Example 1 so that the coating thickness was 10 μm, dried at 80° C. for 30 minutes under forced circulation, then placed in an atmosphere of room temperature for 3 days to prepare test pieces.

Scratch resistance, weatherability, initial adhesion, adhesion in warm water, solvent resistance, heat cycle resistance and hardness were measured with the test pieces. The results are shown in Table 1 and Table 2.

Example 3

To a formulated product obtained by adding 5 parts of methyl isobutylketone, 10 parts of normal butanol, further 2 parts of a WV absorbent "Sanduvor 3206" (Sandoz Corp.) and 2 parts of a stabilizer "Sanduvor 3058" (Sandoz Corp.) to 83 parts of the acrylic resin solution #A obtained in Production Example 1, 1 part of aluminum tris-acetylacetonate was added to produce a coating composition #A-1. 100 parts of the coating composition #A-1 was added with 10 parts of the curing agent containing triphenylsilanol in Example 1, spray-coated on various resin samples shown in Table 2 and Table 3 so that the coating thickness was 20 μm, dried at 80° C. for 30 minutes under forced circulation, then placed in atmosphere of room temperature for 3 days to prepare test pieces.

Initial adhesion, adhesion in warm water, and solvent resistance were evaluated with the test pieces. The results are shown in Table 3.

Example 4

To a formulated product obtained by adding 5 parts of methyl isobutylketone, 10 parts of normal butanol, further 2 parts of a UV absorbent "Sanduvor 3206" (Sandoz Corp.) and 2 parts of a photo-stabilizor "Sanduvor 3058" (Sandoz Corp.) to 83 parts of the acrylic resin solution #E obtained in Production Example 5, 1 part of aluminum tris-acetylacetonate, 3 parts of triphenylsilanol and 3 parts of acetylacetone were added to produce a one-package coating composition #E-1.

The coating composition #E-1 was spray-coated on polypropylene resin ("BC-8B" by Mitsubishi Petrochemical Corp.) samples so that the coating thickness was 25 μm, dried at 80° C. for 30 minutes under forced circulation, then placed in an atmosphere of room temperature for 3 days to prepare test pieces.

Example 5

To a formulated product obtained by adding 5 parts of methyl isobutylketone, 10 parts of normal butanol, further 2 parts of a UV absorbent "Sanduvor 3206" (Sandoz Corp.) and 2 parts of a photo-stabilizer "Sanduvor 3058" (Sandoz Corp.) to 83 parts of the acrylic resin solution #C obtained in Production Example 3, 1 part of aluminum tris-acetylacetonate and 3 parts of triphenylsilanol were added to produce a one-package coating composition #C-2.

The coating composition #C-2 added with the above-mentioned curing agent was spray-coated on ABS resin samples degreased with isopropylalcohol and polycarbonate resin samples used in Example 1 so that the coating thickness was 10 μm, dried at 80° C. for 30 minutes under forced circulation, then placed in an atmosphere of room temperature for 3 days to prepare test pieces.

Scratch resistance, weatherability, initial adhesion, adhesion in warm water, solvent resistance, heat cycle resistance and hardness were measured with the test pieces. The results are shown in Table 1 and Table 2.

Comparative Example 1

To a formulated product obtained by adding 5 parts of methyl isobutylketone, 10 parts of normal butanol, further 2 parts of a UV absorbent "Sanduvor 3206" (Sandoz Corp.) and 2 parts of a photo-stabilizer "Sanduvor 3058" (Sandoz Corp.) to 83 parts of the acrylic resin solution #D obtained in Production Example 4, 1 part of aluminum tris-acetylacetonate was added to produce a coating composition #D-1. 100 parts of the coating composition #D-1 was added with 10 parts of the curing agent containing triphenylsilanol in Example 1, spray-coated on various resin samples so that the coating thickness was 20 μm, dried at 80° C. for 30 minutes under forced circulation, then placed in an atmosphere of room temperature for 3 days to prepare test pieces.

Initial adhesion, adhesion in warm water, and solvent resistance were evaluated with the test pieces. The results are shown in Table 2 and Table 4.

Comparative Example 2

An acrylic-urethane coating ["Origiplate Z" by Origin Electric Co.] was spray-coated on the same isopropyl alcohol degreased polycarbonate resin samples and ATBS resin samples as used in Example 1, so that the coating thickness was 10 μm, dried at 80° C. for 30 minutes under forced circulation, then placed in an atmosphere of room temperature for 5 days to prepare test pieces.

Scratch resistance, weatherability, initial adhesion, adhesion in warm water, solvent resistance, heat cycle resistance and hardness were measured with the test pieces. The results are shown in Table 1 and Table 2.

Comparative Example 3

A scratch resistant acrylic-urethane coating ["Planet RU" by Origin Electric Co.] was spray-coated on the same isopropyl alcohol degreased polycarbonate resin samples and ABS resin samples as used in Example 1, so that the coating thickness was 10 μm, dried at 80° C. for 30 minutes under forced circulation, then placed in an atmosphere of room temperature for 5 days to prepare test pieces.

Scratch resistance, weatherability, initial adhesion, adhesion in warm water, solvent resistance, heat cycle resistance, and hardness were measured with the test pieces. The results are shown in Table 1 and Table 2.

Comparative Example 4

A UV curing resin of the formulation shown in Table 5 was spray-coated on the same degreased polycarbonate resin samples and ABS resin samples as used in Example 1 so that the coating thickness was 5 μm. After the residual organic solvent was evaporated to 10% by weight, the samples were irradiated with UV light using a UV lamp in air so that the dose rate at wavelength 340 to 380 nm is kept to be 160 to 250 mW/cm$^2$ and the irradiation was stopped at the dose of 3,000 mJ/cm$^2$ at wavelength 340 to 380 nm to make the test pieces.

Scratch resistance, weatherability, initial adhesion, adhesion in warm water, solvent resistance, thermal resistance, and hardness were measured with the test pieces. The results are shown in Table 1 and Table 2.

TABLE 1

Evaluation with Polycarbonate Resin Material

|  | Scrth Res | Weathty Adh | Weathty App | Init Adh | W.W Res | Solv Res | HtCyc Res | Therm Res | Hdnss |
|---|---|---|---|---|---|---|---|---|---|
| App Ex 1 | 5 | P | P | P | P | P | P | 5 | F |
| App Ex 2 | 5 | P | P | P | P | P | P | 5 | F |
| App Ex 5 | 5 | P | P | P | P | P | P | 5 | F |
| Com Ex 1 | 2 | P | P | P | P | P | P | 4 | HB |
| Com Ex 2 | 1 | Del | P | P | P | P | P | 4 | F |
| Com Ex 3 | 4 | Del | P | P | P | F | P | 4 | HB |
| Com Ex 4 | 0 | Del | Crk | P | P | P | P | 2 | F |

Scrtch Res: Scratch Resistance,
Weathty: Weatherability,
Init Adh: Initial Adhesion,
W.W. Res: Adhesion in Warm Water,
Solv Res: Solvent Resistance,
HtCyc Res: Heat Cycle Resistance,
Therm Res: Thermal Resistance,
Hdnss: Hardness,
App Ex: Application Example,
Com Ex: Comparative Example,
P: Pass,
F: Fail,
Del: Delaminated,
Crk: Cracked.

TABLE 2

Evaluation with ABS Resin Material

|  | Scrtch Res | Weathty Adh | Weathty App | Init Adh | W.W. Res | Solv Res | HtCyc Res | Hdnss |
|---|---|---|---|---|---|---|---|---|
| App Ex 1 | 5 | P | P | P | P | P | P | F |
| App Ex 2 | 5 | P | P | P | P | P | P | F |
| App Ex 5 | 5 | P | P | P | P | P | P | F |
| Com Ex 2 | 1 | Del | P | P | P | P | P | F |
| Com Ex 3 | 4 | Del | P | P | P | F | P | HB |

TABLE 2-continued

Evaluation with ABS Resin Material

| | Scrtch Res | Weathty | | Init W.W. Adh | W.W. Res | Solv Res | HtCyc Res | Hdnss |
|---|---|---|---|---|---|---|---|---|
| | | Adh | App | | | | | |
| Com Ex 4 | 5 | Del | Crk | P | P | P | P | F |

TABLE 3

Evaluation with Various Materials

| | ABS R | Acrylic R | PC/ABS R | Noryl R | NorylGTX R |
|---|---|---|---|---|---|
| Init Adh | | | | | |
| App Ex 3 | P | P | P | P | P |
| Com Ex 1 | P | P | P | P | P |
| W. W. Res | | | | | |
| App Ex 3 | P | P | P | P | P |
| Com Ex 1 | F, W | F, W | F, W | F, W | F, W |
| Solv Res | | | | | |
| App Ex 3 | P | P | P | P | P |
| Com Ex 1 | F | F | F | F | F |

R: Resin
W: Discoloration into white
ABS Resin: Cycolac UT20B (Ube Cycon Corp.)
Acrylic Resin: Acrylite EX#001 (Mitsubishi Rayon Corp.)
PC/ABS Resin: Ubeloy CX10A (Ube Cycon Corp.)
Noryl Resin: Modified PPO Resin, Noryl EXT130 (Japan GE Plastics Corp.)
Noryl GTX Resin: PPE/Polyamide Alloy, Noryl GTX 600 (Japan GE Plastics Corp.)

TABLE 4

| | | Polypropylene |
|---|---|---|
| Initial Adhesion | Example 4 | Pass |
| | Comparative Example 1 | Fail |
| Adhesion in Warm Water | Example 4 | Pass |
| | Comparative Example 1 | Fail |
| Sovent Resistance | Example 4 | Pass |
| | Comparative Example 1 | Pass |

TABLE 5

| Formulation Component | Amount (Parts) |
|---|---|
| Dipentaerythritol hexaacrylate | 4 |
| Tetrahydrofurfuryl acrylate | 12.14 |
| 2-hydroxy-4-n-octoxybenzophenone (UV absorber) | 3 |
| Benzoin isopropyl ether (Initiator) | 0.4 |
| Benzophenone (Initator) | 0.4 |
| Polymethyl methacrylate | 0.05 |
| Isopropyl alcohol | 70 |
| n-butyl acetate | 25 |
| Ethyl cellosolve | 5 |

Possibility of Industrial Applications

A surface-coated plastic-molded product which is coated with the specific coating provided according to the present invention has a coated film of a good scratch resistance, thermal resistance, adhesion on substrate, and appearance of coated surface as well as excellent weatherability. Thus, the product is extremely excellent in applications such as head-lamp covers for an automobile, in which thermal resistance is required, so that the weatherability of polycarbonate resin molded products can be secured.

We claim:

1. A surface-coated plastic product which is a molded product of a resin selected from the group consisting of a polycarbonate resin, an ABS resin, an acrylic resin, a polyvinyl chloride resin, a polyamide resin, a polyphenylene oxide resin and a resin alloy containing these, coated with a coating compound composed of a curable resin composition containing the following (a) to (d):

(a) 100 parts by weight of an acrylic resin ($a^1$) having a weight average molecular weight of 2,000 to 30,000 containing no hydroxyl group and containing one or more cycloaliphatic epoxy group(s), (b) 0.01 to 10 parts by weight of a complex having oxygen ligands, (c) 0.01 to 10 parts by weight of a silicon compound with a silanol group or capable of forming a silanol group by heating or photo-irradiation, and (d) 0.01 to 10 parts by weight of an UV absorbent.

2. A surface-coated plastic product which is a molded product of a resin alloy containing an ABS resin, coated with a coating compound composed of a curable resin composition containing the following (a) to (d):

(a) 100 parts by weight of an acrylic resin ($a^2$) having a weight average molecular weight of 2,000 to 30,000 containing one or more hydroxyl group(s) and one or more cycloaliphatic epoxy group(s), (b) 0.01 to 10 parts by weight of a complex having oxygen ligands, (c) 0.01 to 10 parts by weight of a silicon compound with a silanol group or capable of forming a silanol group by heating or photo-irradiation, and (d) 0.01 to 10 parts by weight of an UV absorbent.

3. A surface-coated plastic product which is a polycarbonate resin or an ABS resin molded product coated with a coating composed of a curable resin composition containing the following (a) to (d):

(a) 100 parts by weight of an acrylic resin ($a^4$) having a weight average molecular weight of 2,000 to 10,000 containing one or more hydroxyl group(s) and one or more cycloaliphatic epoxy group(s), (b) 0.01 to 10 parts by weight of a complex having oxygen ligands, (c) 0.01 to 10 parts by weight of a silicon compound with a silanol group or capable of forming a silanol group by heating or photo-irradiation, and (d) 0.01 to 10 parts by weight of an UV absorbent.

4. A surface-coated plastic-molded product which is a polypropylene resin molded product coated with a coating composed of a curable resin composition containing the following (a) to (e):

(a) 100 parts by weight of an acrylic resin ($a^1$) having a weight average molecular weight of 2,000 to 30,000 containing no hydroxyl group and containing one or more cycloaliphatic epoxy group(s) or an acrylic resin ($a^2$) having a weight average molecular weight of 2,000 to 30,000 containing one or more hydroxyl group(s) and one or more cycloaliphatic epoxy group(s), (b) 0.01 to 10 parts by weight of a complex having oxygen ligands, (c) 0.01 to 10 parts by weight of a silicon compound with a silanol group or capable of forming a silanol group by heating or photo-irradiation, (d) 0.01 to 10 parts by weight of an UV absorbent, and (e) 5 to 50 parts by weight of a chlorinated polyolefin.

5. A surface-coated plastic-molded product which is a polypropylene resin molded product coated with a coating composed of a curable resin composition containing the following (a) to (f):

(a) 100 parts by weight of an acrylic resin ($a^1$) having a weight average molecular weight of 2,000 to 30,000 containing no hydroxyl group and containing one or more cycloaliphatic epoxy group(s) or an acrylic resin ($a^2$) having a weight average molecular weight of 2,000 to 30,000 containing one or more hydroxyl group(s) and one or more cycloaliphatic epoxy group(s), (b) 0.01 to 10 parts by weight of a complex having oxygen ligands, (c) 0.01 to 10 parts by weight of a silicon compound with a silanol group or capable of forming a silanol group by heating or photo-irradiation, (d) 0.01 to 10 parts by weight of an UV absorbent, (e) 5 to 50 parts by weight of a chlorinated polyolefin, and (f) 0.01 to 10 parts by weight of a photo-stabilizer.

6. A surface-coated plastic product which is a polypropylene resin molded product coated with a coating composed of a curable resin composition containing the following (a) to (c):

(a) 100 parts by weight of a chlorinated polyolefin-modified acrylic resin ($a^3$) which is made by modifying 100 parts by weight of an acrylic resin having a weight average molecular weight of 2,000 to 30,000 containing one or more cycloaliphatic epoxy group(s) with 5 to 50 parts by weight of a chlorinated polyolefin having chlorine content of 10 to 50 weight %, (b) 0.01 to 10 parts by weight of a complex having oxygen ligands, (c) 0.01 to 10 parts by weight of a silicon compound with a silanol group or capable of forming a silanol group by heating or photo-irradiation.

7. A surface-coated plastic-molded product which is a polypropylene resin molded product coated with a coating composed of curable resin composition containing the following (a) to (e):

(a) 100 parts by weight of an acrylic resin ($a^3$) which is made by modifying 100 parts by weight of an acrylic resin having a weight average molecular weight of 2,000 to 30,000 containing one or more cycloaliphatic epoxy group(s) with 5 to 50 parts by weight of a chlorinated polyolefin having a chlorine content of 10 to 50 weight %, (b) 0.01 to 10 parts by weight of a complex having oxygen ligands, (c) 0.01 to 10 parts by weight of a silicon compound with a silanol group or capable of forming a silanol group by heating or photo-irradiation, (d) 0.01 to 10 parts by weight of an UV absorbent, and (e) 0.01 to 10 parts by weight of a photo-stabilizer.

8. A surface-coated plastic molded product made by the process of coating a molded product of a resin selected from group consisting of a polycarbonate resin, an ABS resin, an acrylic resin, a polyvinyl chloride resin, a polyamide resin, a polyphenylene oxide resin, and resin alloys containing one or more of said resins, with a curable resin coating composition made by mixing together:

(a) an acrylic resin essentially devoid of hydroxyl groups and having a weight average molecular weight of 2,000 to 30,000 and containing at least one cycloaliphatic epoxy group; and based upon 100 parts by weight of the said acrylic resin in the coating composition, (b) about 0.01 to 10 parts by weight of a complex having oxygen ligands;

(c) about 0.01 to 10 parts by weight of a silicon compound, said silicon compound either containing a silanol group or being capable of forming a silanol group upon subjection to heat or photo-irradiation; and (d) about 0.01 to 10 parts by weight of an UV absorbent;

said coated product having excellent weatherability and scratch resistance.

9. The surface-coated plastic molded product of any one of claims 1 to 8, wherein said curable resin composition is cured.

* * * * *